(12) United States Patent
Sugiura et al.

(10) Patent No.: US 7,260,625 B2
(45) Date of Patent: Aug. 21, 2007

(54) DATA CENTER SYSTEM AND METHOD FOR CONTROLLING THE SAME

(75) Inventors: Yoko Sugiura, Minamiashigara (JP); Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 10/769,482

(22) Filed: Jan. 30, 2004

(65) Prior Publication Data
US 2005/0015657 A1    Jan. 20, 2005

(30) Foreign Application Priority Data
Jun. 27, 2003  (JP)  ............................. 2003-183743

(51) Int. Cl.
*G06F 15/173* (2006.01)
(52) U.S. Cl. ..................... 709/223; 714/100
(58) Field of Classification Search ............... 709/249, 709/225, 226, 217–219, 223; 711/162, 100, 711/158; 714/2, 7, 11, 13, 6, 15, 20, 42, 714/100
See application file for complete search history.

(56) References Cited

U.S. PATENT DOCUMENTS

| | | | | |
|---|---|---|---|---|
| 4,757,442 A | * | 7/1988 | Sakata | ......................... 714/11 |
| 5,554,347 A | | 9/1996 | Busson et al. | |
| 5,557,753 A | | 9/1996 | Suenaga et al. | |
| 5,581,724 A | | 12/1996 | Belsan et al. | |
| 5,657,440 A | * | 8/1997 | Micka et al. | .................. 714/16 |
| 5,742,792 A | * | 4/1998 | Yanai et al. | ................. 711/162 |
| 5,987,566 A | | 11/1999 | Vishlitzky et al. | |
| 6,148,412 A | | 11/2000 | Cannon et al. | |
| 6,173,377 B1 | * | 1/2001 | Yanai et al. | ................. 711/162 |
| 6,446,224 B1 | | 9/2002 | Chang et al. | |
| 6,502,205 B1 | * | 12/2002 | Yanai et al. | ................... 714/7 |
| 6,594,786 B1 | | 7/2003 | Connelly et al. | |
| 6,643,795 B1 | * | 11/2003 | Sicola et al. | .................... 714/6 |
| 6,701,455 B1 | | 3/2004 | Yamamoto et al. | |
| 6,725,331 B1 | * | 4/2004 | Kedem | ........................ 711/117 |
| 6,823,349 B1 | * | 11/2004 | Taylor et al. | ............... 707/204 |
| 6,907,505 B2 | * | 6/2005 | Cochran et al. | ............ 711/162 |
| 7,058,731 B2 | * | 6/2006 | Kodama | ........................ 710/5 |

(Continued)

OTHER PUBLICATIONS

"The Technology of Disaster Recovery," Veritas Software Corporation Mountain View, CA (Oct. 2003).

(Continued)

*Primary Examiner*—Nathan Flynn
*Assistant Examiner*—Mohammad Siddiqi
(74) *Attorney, Agent, or Firm*—Townsend and Townsend and Crew LLP

(57) ABSTRACT

In one aspect of the invention, A data center system comprises a plurality of data centers each including a computer and a storage system. The computers each include a memory area for storing information about an order of operating priorities among the computers and another memory area for storing a cluster service program, whereby when an active computer from the computers fails as a failed computer, the cluster service program is executed to select a standby computer from the remaining computers according to the information about the order of operating priorities to be a failover computer to take over processing from the failed computer. The information about the order of operating priorities may relate to the types of remote copy operation used between the storage systems.

24 Claims, 9 Drawing Sheets

U.S. PATENT DOCUMENTS

| | | |
|---|---|---|
| 7,082,506 B2 * | 7/2006 | Nakano et al. ............. 711/162 |
| 2002/0083036 A1 | 6/2002 | Price |
| 2003/0051111 A1 | 3/2003 | Nakano et al. |
| 2004/0024975 A1 | 2/2004 | Morishita et al. |
| 2004/0078628 A1 | 4/2004 | Akamatu et al. |
| 2004/0093361 A1 | 5/2004 | Therrien et al. |
| 2004/0098411 A1 * | 5/2004 | Highleyman et al. .... 707/104.1 |
| 2004/0153719 A1 | 8/2004 | Achiwa et al. |
| 2004/0230859 A1 * | 11/2004 | Cochran et al. ............... 714/2 |

OTHER PUBLICATIONS

"Enterprise Continuity-A High Availability Application Solution,", Sun Microsystems, Inc. Santa Clara, CA (Nov. 2003).

* cited by examiner

Remote copy status management table

| Node type | Remote copy type | Priority key 1 | Priority key 2 ⋯ | Active node |
|---|---|---|---|---|
| Node A | host | 0 | 0 | 1 |
| Node B | sync | 1 | 20 | 0 |
| Node C | async | 2 | 350 | 0 |
| ⋮ | ⋮ | ⋮ | ⋮ | ⋮ |

DATA CENTER SYSTEM AND METHOD FOR CONTROLLING THE SAME

CROSS-REFERENCES TO RELATED APPLICATIONS

This application relates to and claims priority from Japanese Patent Application No. 2003-183743, filed on Jun. 27, 2003, the entire disclosure of which is incorporated herein by reference.

BACKGROUND OF THE INVENTION

The present invention relates to a data center system comprising a plurality of data centers, and more particularly to failover/failback control that is exercised when host computers in a cluster configuration are connected to each data center.

Computers have begun to retain valuable information as the society has been increasingly IT-driven in recent years. If, for instance, a natural calamity happens unexpectedly, it is extremely important that data be safety saved and retained. Under such a circumstance, it is essential to provide storage system/data redundancy and establish proper means for storage system/data recovery.

Meanwhile, a cluster service can be used as a means for providing system redundancy. A cluster is a system in which a standby computer is furnished in addition to a main computer to provide against a failure in a computer so that even if the main computer should stop running, processing can be transferred to the standby computer to continuously perform the current operation without shutting down the computers. Further, when the main computer stops running and processing is transferred to a standby computer, the standby computer is allowed to recognize a disk volume that has been recognized by the main computer. Because of these features, the cluster service is incorporated into important systems as a technology.

A technology available for data redundancy retains a copy of data among a plurality of storage systems connected to a host computer. A technology for allowing storage systems that may be positioned physically far from each other to exchange data is called a remote copy. A certain remote copy technology is also proposed for permitting a plurality of storage systems to mutually copy data without a host computer. When the above remote copy technology is used in conjunction with a cluster configuration technology, an increased degree of system/data redundancy can be provided.

Provision of increased degree of system/data redundancy will now be described with reference to an example in which a storage system is connected to each of two host computers while one of the host computers is designated as a standby computer with the other designated as an active computer to form a cluster. If the storage system connected to an active host computer performs a remote copy to the other storage system connected to the remaining host computer on standby, setup is performed so that a volume on the active storage system (remote copy source) can be recognized by the active host computer to be connected to active storage system and that a volume on the standby storage system (remote copy destination) can be recognized by the standby host computer to be connected to the standby storage system. If a failure occurs in the active host computer with the system described above, the cluster service transfers processing to the standby host computer so that the standby host computer can recognize the data in the storage system at the remote copy destination.

Further, the storage system to be connected to the host computer that has received processing can be set as a remote copy source with the storage system at the remote copy source set as a remote copy destination. Even if a failure occurs in a host computer, the storage system's remote copy direction can be changed (by interchanging the copy source and copy destination) as described above so that remote copy operations can be continuously performed without halting the overall system operation.

Two remote copy methods are available: synchronous transfer method and asynchronous transfer method. FIG. 3 illustrates how the remote copy process is performed. For explanation purposes, the computers constituting the individual systems are designated by node A, node B, node C, and node D.

When, in a remote copy operation 1200 based on the synchronous transfer method, storage system A 1020 receives a write instruction for data from node A 1010 ((1)), it issues a write instruction for the same data to storage system B 1021 ((2)). When the data is completely written into storage system B 1021, a completion notification is transmitted to storage system A 1020 ((3)), and a write completion notification is issued to node A 1010 ((4)). In this instance, an update is performed while the data retained by storage system A 1020, which is connected to node A, is kept identical with the data retained by storage system B 1021. This manner of remote copy operation is referred to as a synchronous remote copy operation. On the other hand, when, in a remote copy operation 1201 based on the asynchronous transfer method, storage system C 1022 receives a write instruction for data from node C 1013, it issues a write completion instruction for the same data to node C 1013 ((2)). Storage system C 1022 issues a write instruction to storage system D 1023 asynchronously relative to a process requested by node C 1013, and receives a write completion notification ((4)).

The difference between the two methods will now be described. When performing a remote copy operation 1200 based on the synchronous transfer method, storage system A copies the data written in storage system A 1020 at a remote copy source to storage system B 1021 at a remote copy destination synchronously relative to a write instruction of node A 1010, which is a host computer. Therefore, the storage systems usually retain the same data. When performing a remote copy operation 1201 based on the asynchronous transfer method, a storage system copies the data written in storage system C 1022 at a remote copy source to storage system D 1023 at a remote copy destination asynchronously relative to a write instruction from node C 1013, which is a host computer. In other words, storage system C 1022 transfers data designated by a write request from node C 1013 to storage system D 1023, which is a remote copy destination, after issuing a notification of completion of a data write to node C 1013. The above data transfer operation is performed according to a task schedule unique to storage system C 1022. Therefore, storage system D 1023 at the remote copy destination retains old data for a longer period of time than the remote copy source. However, a data write completion notification is transmitted to node C 1013 without waiting for the process for data transfer to storage system D 1023 at the remote copy destination. As a result, node C 1013 can immediately proceed to the next process (see, e.g., U.S. Pat. No. 5,554,347).

BRIEF SUMMARY OF THE INVENTION

In recent years, however, the importance of data retained by information systems has increased as stated earlier. Therefore, the use of a system containing two differently positioned storage systems is now inadequate. Further, it is desired that the operation of an information processing system in particular be not interrupted in the event of a failure or that the duration of such a failure-induced interruption be shortened.

The hardware configuration according to an exemplary embodiment of the present invention for solving the foregoing problems will now be described briefly with reference to FIG. 2.

As shown in FIG. 2, the system according to the embodiment comprises at least three information processing systems, which each include a storage system. The information processing systems are interconnected via a network. The first storage system A, which is connected to an active computer 1010 (hereinafter referred to as node A) executing main jobs and used as a copy source, is network-connected to the second storage system B 1021, which is installed near the first storage system A 1020, and to the third storage system C 1022, which is installed at a place farther than the second storage system B 1021. The employed configuration is such that a remote copy operation 1080 based on the synchronous transfer method is performed between storage system A, which is a copy source, and storage system B, which is installed at a place relatively near storage system A, and that a remote copy operation based on the asynchronous transfer method is performed between storage system A and storage system C, which is installed so that its distance to storage system A is greater than the distance between storage system A, which is a copy source, and storage system B.

An alternative configuration may be employed so that an additional remote copy operation based on the asynchronous transfer method is performed between storage system B, which is installed near storage system A at the copy source, and storage system C, which is installed far from the copy source.

The use of the above configuration increases the degree of data redundancy and information processing system redundancy. Further, a synchronous data transfer is made between an active information processing system at a copy source and an information processing system near the copy source while an asynchronous data transfer is made between the active information processing system at the copy source and an information processing system far from the copy source. Therefore, the advantages brought by a synchronous data transfer and the advantages brought by an asynchronous data transfer can be both enjoyed on the whole. Performing a remote copy operation based on the synchronous transfer method provides an advantage in that both storage systems can retain the same data. However, if this method is used for a data transfer to a remotely positioned storage system, efficiency may decrease because a data copy operation takes a considerable amount of time. On the other hand, a remote copy operation based on the asynchronous transfer method produces a temporary data difference between connected storage systems. However, the remote copy process will not interrupt the processes of the storage systems or their higher-level computers.

As shown in FIG. 2, therefore, overall well-balanced performance is provided by the above configuration in which a remote copy operation based on the synchronous transfer method is performed between a storage system at a remote copy source and a storage system installed near the copy source and the asynchronous transfer method is used for a remote copy operation relative to a storage system that is installed far from the storage system at the remote copy source. In other words, when there are three data centers (copy source data center, near copy destination data center, and far copy destination data center), which each include an internal storage system and are interconnected via a network, high efficiency can be achieved by using the synchronous transfer method to perform a remote copy operation from the copy source data center to the near copy destination data center and the asynchronous transfer method to perform a remote copy operation from the copy source data center to the far copy destination data center. This type of configuration is very effective as a multi-point remote copy configuration containing three or more data centers.

Typically, the term "near" refers to a distance of several kilometers such as the distance between Shibuya and Ebisu, whereas the term "far" refers to a distance of several hundred kilometers such as the distance between Tokyo and Osaka. However, these distance values are not fixed. The definitions of the terms "near" and "far" vary more or less, for instance, with the system performance requirements for response to high-level hardware and the promptness required for failure recovery. In some cases, the term "near" may refer to the other floors within the same building.

For explanation purposes, a data center configuration in which a copy source data center (hereinafter referred to as the "main data center"), a data center near the main data center, and a data center far from the main data center are included is now called a 3-data center configuration. The included three data centers each include a storage system, and the storage systems are interconnected via a computer network.

One typical embodiment of a 3-data center configuration according to the exemplary embodiment of the present invention will now be described. Each data center comprises a host computer and a storage system that is connected to the host computer. The host computers of the three data centers are interconnected via the same network (e.g., a network based on TCP/IP). Software providing a cluster service is resident on these host computers and configured so that its operation can be taken over by another computer at the operator's instruction or upon failure detection. The storage systems are interconnected via a network other than used for the host computers, such as a SAN, and the employed configuration is such that a data transfer from the main data center's storage system to the near data center's storage system is made by performing a remote copy operation based on the synchronous transfer method, and that a data transfer from the main data center's storage system to the far data center's storage system is made by performing a remote copy operation based on the asynchronous transfer method.

Even if a failure occurs in a host computer connected to the main data center's storage system, the data center configuration connected as described above initiates a failover switch to the near or far host computer so that the near or far host computer takes over the currently executed job to assure continuous job execution. If data center configuration initiates a failover switch to the near host computer connected to a storage system to which data has been transferred by the synchronous transfer method, the storage system has the same data as the main data center and is therefore capable of immediately taking over the current job and continuously executing it. In this instance, the host computer newly selected as a failover continues with job execution. Therefore, the storage system connected to this host computer now becomes the main storage system.

Meanwhile, the data to be updated or stored after the above failover also needs to be made redundant in compliance with the above-mentioned demand. Therefore, a remote copy operation is performed relative to a storage system connected to the original main data center. In this instance, the configuration should be formed so as to perform a synchronous copy operation from the newly selected main storage system to a storage system that constituted the original main data center before the failover. In other words, the failover process, including remote copy environment establishment, can be completed simply by changing the remote copy direction.

When a host computer for the far data center employing the asynchronous data transfer method is selected as a failover, it is likely that the storage system connected to that host computer retains older data than the copy source. It is therefore necessary to reference, prior to the failover process, either the latest data in a storage system within the main data center prevalent before the failover or the data in a storage system within another data center that is updated in synchronism with the latest data and perform an update until the latest state is reached or copy the latest data. In other words, a storage system at a relatively far location for which an asynchronous data transfer is usually made does not have the latest data. Therefore, when a host computer connected to such a storage system is to be selected as a failover, a satisfactory result can be obtained by copying the latest data, which is retained by the original copy source or a relatively near storage system to which a synchronous data transfer is made, to a storage system connected to a host computer that newly becomes active.

Another aspect of the present invention is to provide a system in which an optimum failover can be selected while considering the above-mentioned various factors when a computer in a sub data center becomes a failover for an active host computer in a main data center for some reason in an environment comprising the main data center, which is mainly an active one, and a plurality of sub data centers.

In order to select the optimum failover, the data center system acquires configuration information, including the information about remote copy status, from a storage system connected to a local node within a data center, that is, a local computer, and then creates a remote copy status management table (hereinafter referred to as the management table), which indicates the relationship between the storage system's remote copy status and the host computer. When the management table is shared by all the host computers, the host computer in each data center can recognize in what type of remote copy environment the other host computers and the storage systems connected to the other host computers are. If a failure occurs in a host computer in the main data center or occurs in a storage system connected to such a host computer or if their operations are to be halted, the host computer in the main data center references the aforementioned management table and selects an appropriate computer in another data center as a failover. More specifically, the host computer attempting to initiate a failover switch references the management table and selects as a failover a computer connected to a storage system that is updated in synchronism with the locally connected storage system.

After a failover switch is performed, the storage system connected to the computer selected as a failover serves as a main storage system, which mainly stores data. Therefore, the remote copy direction is changed so that the newly selected storage system becomes the copy source for the old main storage system that was prevalent before the failover switch. This remote copy direction change is effected by editing the configuration information that provides storage system management. The configuration information is stored in each storage system. Each storage system references the configuration information and transfers data to another storage system.

For a situation where a host computer within a certain data center is to be selected as a failover, a program may be incorporated so that a host computer references the aforementioned management table and selects an optimum failover whenever a failover switch is needed. However, priority levels may alternatively be predefined and stored in the management table so that the stored priority levels can be referenced to select a failover. As another alternative, a host computer may gather the information about the types of remote copy operations that are performed by the locally connected storage system and storage systems connected to the other host computers, automatically predefine failover priorities, and store them in the management table.

Failover is also called for when a failure occurs in an active host computer. In this instance, the active host computer cannot initiate a failover switch by issuing a command. Therefore, each of the standby host computers in the sub data centers should regularly confirm the operation of the host computer in the main data center by, for instance, using a heartbeat via a network, and if the communication with the host computer in the main data center breaks down, a standby host computer having the highest priority will become a failover. More specifically, each standby host computer serving as a node in a sub data center references the aforementioned management table, when a failure in the active host computer is detected, in order to check whether it is a failover having the highest priority for the faulty host computer. A standby host computer that recognizes itself as a failover having the highest priority as a result of the check begins to perform a failover process.

The host computer references the management table to determine how data should be transferred to the storage systems connected to the other host computers as remote destinations when the locally connected storage system becomes the main storage system, and then updates the management table. In accordance with the updated management table, the locally connected storage system sets up a synchronous remote copy method or asynchronous remote copy method for the storage systems of the other data centers. If a synchronous remote copy method is set between the storage system connected to a possible failover computer having the highest priority and the newly selected main computer, a failover switch to a possible failover computer will be performed with highest efficiency when the newly selected main computer needs failover.

In accordance with one aspect of the present invention, the data center system comprises a plurality of data centers each including a computer and a storage system. The computers each include a memory area for storing information about an order of operating priorities among the computers and another memory area for storing a cluster service program, whereby when an active computer from the computers fails as a failed computer, the cluster service program is executed to select a standby computer from the remaining computers according to the information about the order of operating priorities to be a failover computer to take over processing from the failed computer.

In accordance with another aspect of the present invention, the data center system comprises a first data center which includes a first computer and a first storage system, a second data center which includes a second computer and a second storage system configured to store a copy of data from the first storage system, and a third data center which includes a third computer and a third storage system configured to store a copy of data from the first storage system. A synchronous remote copy operation is performed between the first storage system and second storage system, and an asynchronous remote copy operation is performed between the first storage system and third storage system. The first computer, second computer, and third computer each have a memory area for storing the information about remote copy methods. If the first computer is to initiate failover, it references the memory area storing the information about the remote copy methods and performs a failover switch to the second computer which is connected to the second storage system, based on the information about remote copy methods between the storage systems.

Another aspect of the present invention is directed to a method for controlling a data center system comprises a plurality of data centers each including a computer and a storage system. The method comprises causing a computer other than a first computer to monitor an operating status of the first computer. If a computer other than the first computer detects an operation failure in the first computer, the computer having detected the operation failure references information about an order of operating priorities, which is stored in a memory within the computer, and selects a failover computer. A failover switch is performed from the first computer to the failover computer. Further, a program for exercising control as indicated by the above method is incorporated in each computer so that each computer executes the program so as to exercise failover/failback control within the data centers.

DETAILED DESCRIPTION OF THE INVENTION

Figure 1:
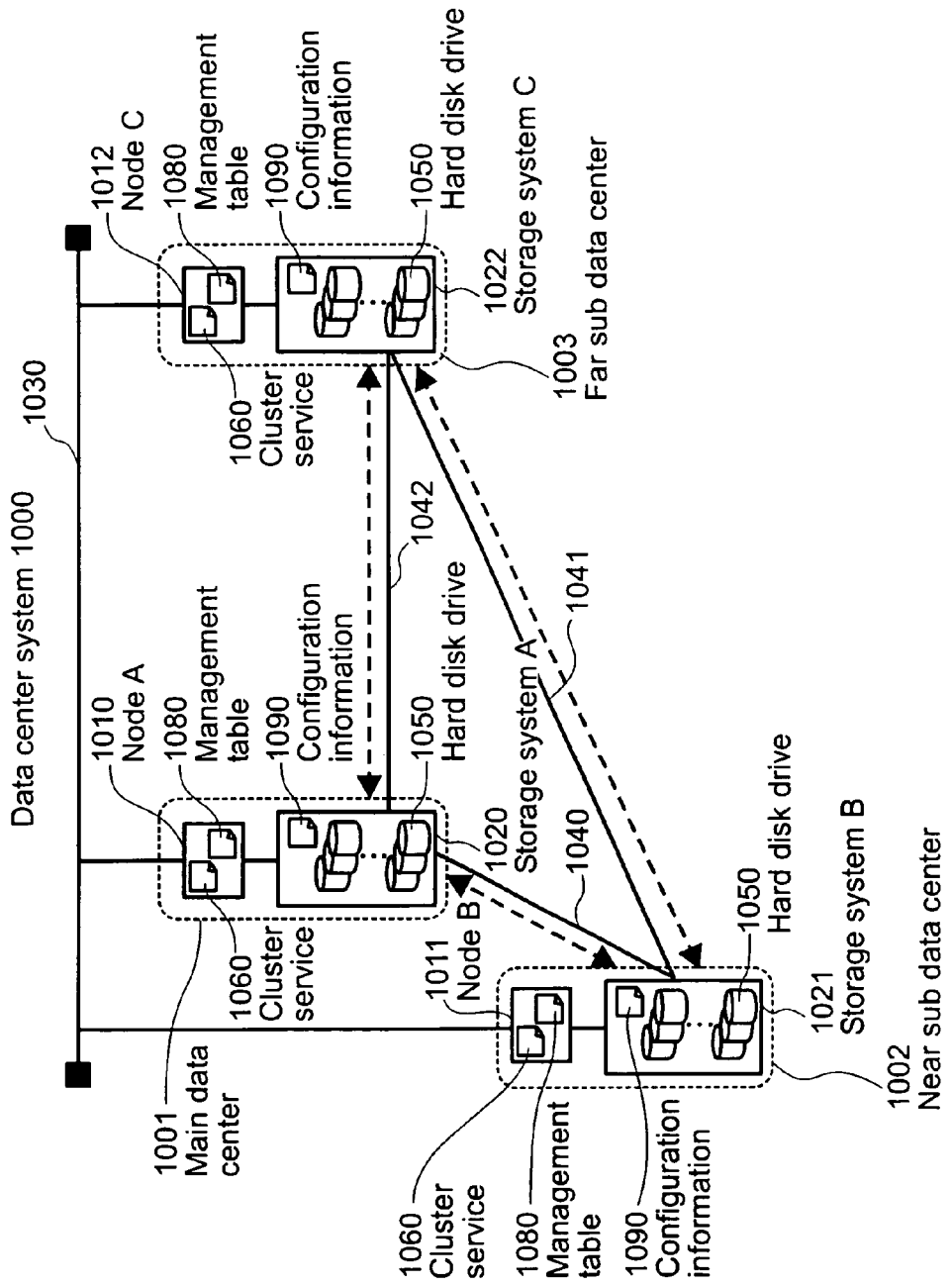
FIG. 1 shows an example of a system configuration according to an embodiment of the present invention.
Figure 2:
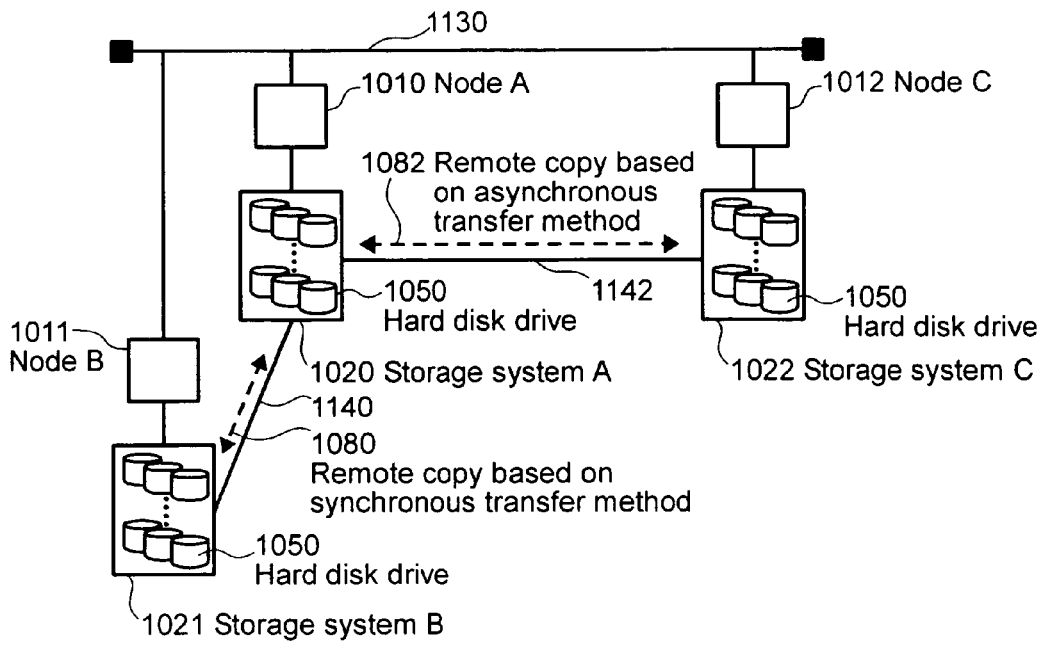
FIG. 2 shows an example of a configuration for a remote copy process.
Figure 3:
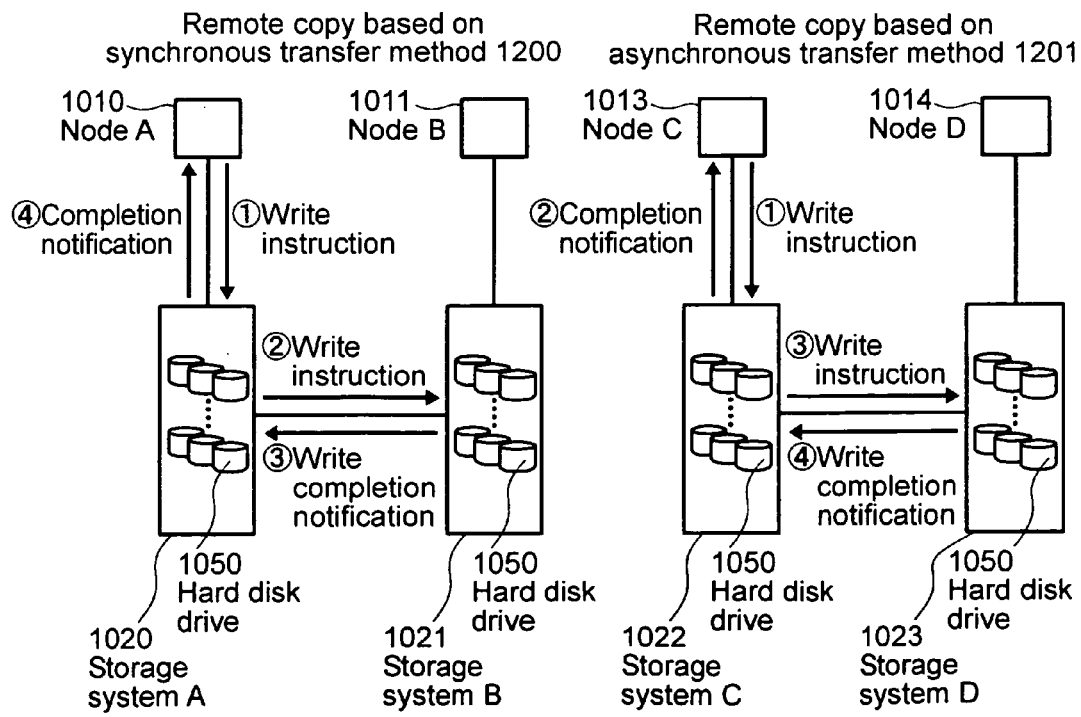
FIG. 3 illustrates a remote copy process based on the synchronous transfer method and a remote copy process based on the asynchronous transfer method.

Specific embodiments of the present invention will now be described in detail with reference to the accompanying drawings. FIG. 1 shows an example of a data center system according to the present embodiment. The data center system 1000 comprises three data centers: a main data center 1001, a near sub data center 1002, and a far sub data center 1003, whose distance from the main data center is greater than the distance between the near sub data center and main data center.

The main data center 1001 comprises node A 1010 and storage system A 1020. In like manner, sub data centers 1002 and 1003 each comprise a node and a storage system connected to that node. Each node is a personal computer, workstation, or other device that may function as a host computer. Node 1010, node 1011, and node 1012 each have software 1060 for providing a cluster service and a management table 1080. These nodes are interconnected via a network 1030 such as a TCP/IP-based network. The data center systems are controlled by computer readable medium containing code for causing operations as described herein. Those skilled in the art will understand that the code comprises computer readable program embodied in a computer usable medium for execution by the data center systems.

Storage system A 1020, storage system B 1021, and storage system C 1022 each have configuration information 1090 and a hard disk drive 1050 for data storage. The configuration information 1090 is stored in a memory within each storage system. Each storage system processes a data read instruction or data write instruction received from a higher-level device while referencing the configuration information. The configuration information includes the information indicating what hard disk is connected, the information about a logical volume which is logically formed on a hard disk, and the information necessary for a remote data copy operation relative to another storage system. The configuration information also includes pairing information, which indicates what logical volume of a storage system is to be copied to what logical volume on what storage system. Further, the stored configuration information includes the information indicating whether the remote copy operation to be performed is based on the synchronous method or asynchronous method. Storage system A 1020, storage system B 1021, and storage system C 1022 are connected respectively via networks 1040, 1041, and 1042. For these connections, SANs (Storage Area Networks) or other networks may be used.

Bidirectional remote copy operations can be performed between network-connected storage systems. Various remote copy methods are selectable. The present embodiment assumes that the synchronous transfer method is set for performing a remote copy from storage system A 1020 to storage system B 1021, and that the asynchronous transfer method is set for performing a remote copy from storage system A 1020 to storage system C 1022.

Figure 4:
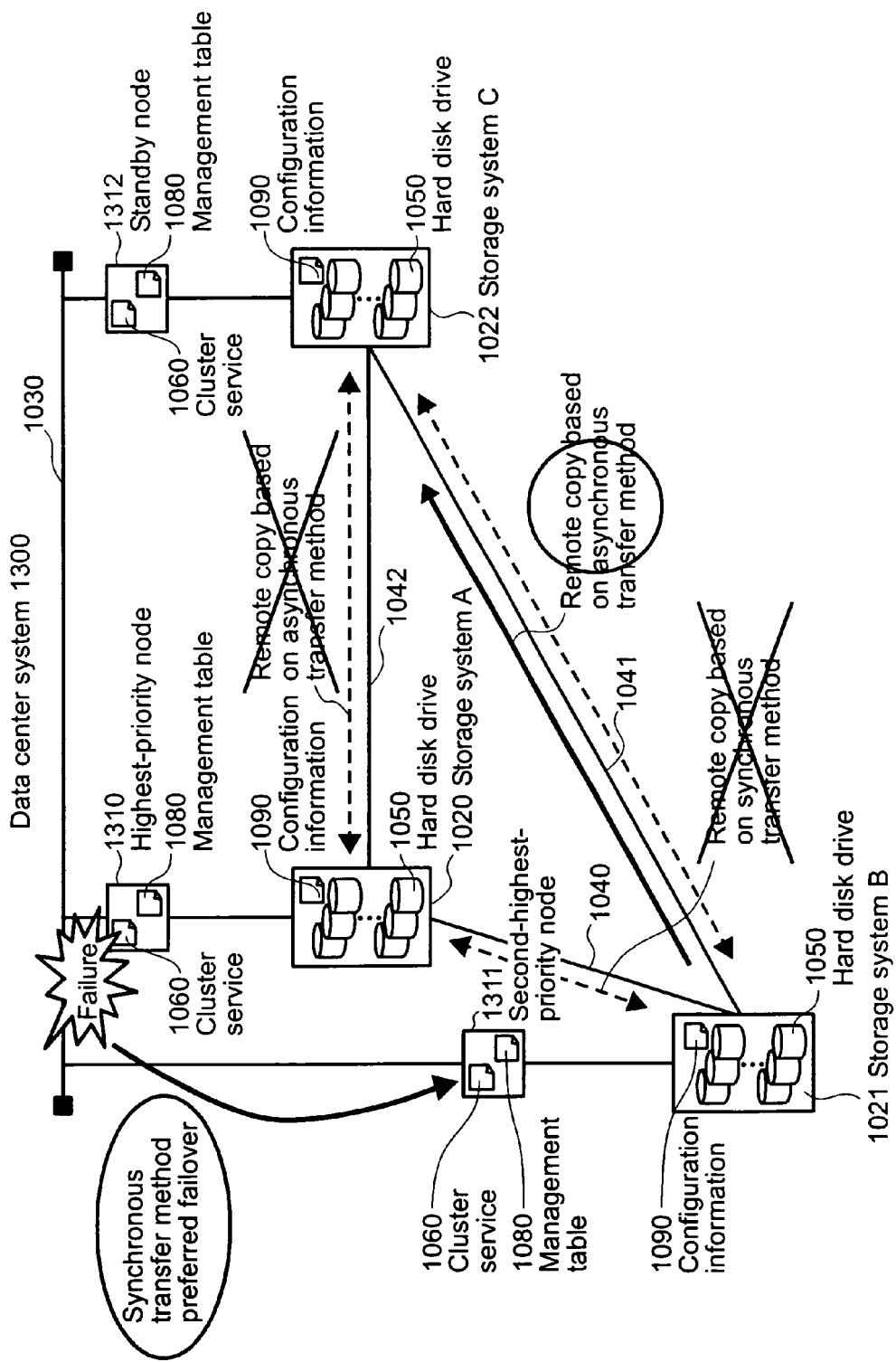
FIG. 4 illustrates a failover process that gives priority to remote copy operations based on the synchronous transfer method.

FIG. 4 shows an embodiment in which a node connected to a storage system that performs a remote copy operation by the synchronous transfer method is preferentially assigned as a node targeted for failover at the time of a failover switch. The configuration for the data center system 1300 shown in FIG. 4 is the same as for the data center system 1000 that has been described with reference to FIG. 1. To clarify the order of node operating priorities, however, the nodes constituting each data center are designated respectively as a highest-priority node 1310, a second-highest-priority node 1311, and a standby node 1312. The highest-priority node represents a currently active node. The second-highest-priority node preferentially takes over the job of a currently active node if the latter node needs failover for some reason. The standby node has a lower priority than the second-highest-priority node and is selected if the second-highest-priority node cannot serve as a failover for some reason. Although three data centers are shown in FIG. 4 for explanation purposes, any number of data centers can be set. If, for instance, there are four data centers, the highest priority is assigned to the currently active node with the remaining three other priorities sequentially assigned to the other nodes.

FIG. 4 assumes that the remote copy operation performed from storage system A 1020 to storage system B 1021 is based on the synchronous transfer method. Upon receipt of a write instruction from the highest-priority node 1310, storage system A 1020 writes data onto the hard disk drive 1050 for storage system A 1020. Storage system A 1020 also issues a write instruction for the same data to storage system B 1021. Upon completion of a data write that is specified by the write instruction, storage system B 1021 transmits a data write completion notification to storage system A 1020. After receipt of the write completion notification from storage system B 1021, storage system A 1020 notifies the highest-priority node 1310 of such write completion. In fact, the data write is performed to storage system A 1020 and storage system B 1021 in synchronism with a write instruction from the highest node. It means that storage system A 1020 and storage system B 1021 basically store the same data.

The above completion of a data write not only means the completion of a write onto a hard disk built in a storage system but also refers to a state in which the storage system can write onto the hard disk. Storage systems have an internal, high-speed cache memory. Many storage systems are configured so as to read a write instruction received from a higher-level device into the cache memory, and upon completion of a read into the cache memory, issue a write completion notification to the higher-level device. Due to this configuration, the higher-level device does not have to wait for the end of access to a slow-responding hard disk.

As the method of data transfer 1082 from storage system A 1020 to storage system C 1022, which are illustrated in FIG. 4, a remote copy operation is performed according to the asynchronous transfer method. Upon receipt of a data write instruction from the highest-priority node 1310, storage system A 1020 writes data into the internal cache memory (not shown), and then issues a data write completion notification to the highest-priority node 1310. Storage system A 1020 issues a data write instruction to storage system C 1022 asynchronously relative to the write instruction from the highest-priority node 1310. More specifically, storage system A 1020 instructs that the write data entered into its local cache memory be written into storage system C 1022 at an arbitrary time. It is therefore possible that storage system C 1022 may have older data than storage system A 1020.

A case where a failure is encountered in the highest-priority node 1310 shown in FIG. 4 will now be described. If a failure occurs in the currently active, highest-priority node, the highest-priority node cannot continue with its process and therefore needs to perform a failover switch to have another node take over its process without delay. It is desirable that this failover switch process be completed within a minimum amount of time as described above. As regards a node selection, therefore, the present embodiment pays attention to the status of a storage system that is connected to the node to be selected. The reason is that the time required for data consistency adjustment, which is essential for node switching, can be minimized by selecting a storage system having a stored data image that is closest to the data image of the data stored in a storage system to which the node that was active before the occurrence of the failure was connected. Therefore, the nodes within the data centers constituting the data center system 1300 of the present embodiment use the management table 1080 to store the information about a storage system targeted for a synchronous remote copy operation relative to a storage system connected to the highest-priority node and the information about identifying a node connected to the targeted storage system. When a node within the data center system detects a failure in the highest-priority node, it references the management table 1080 to check whether it should take over the process of the currently active node. Further, when the currently active, highest-priority node exercises control so as to perform a failover switch to another node, it also references the management table 1080 to select a failover node.

Figure 5:
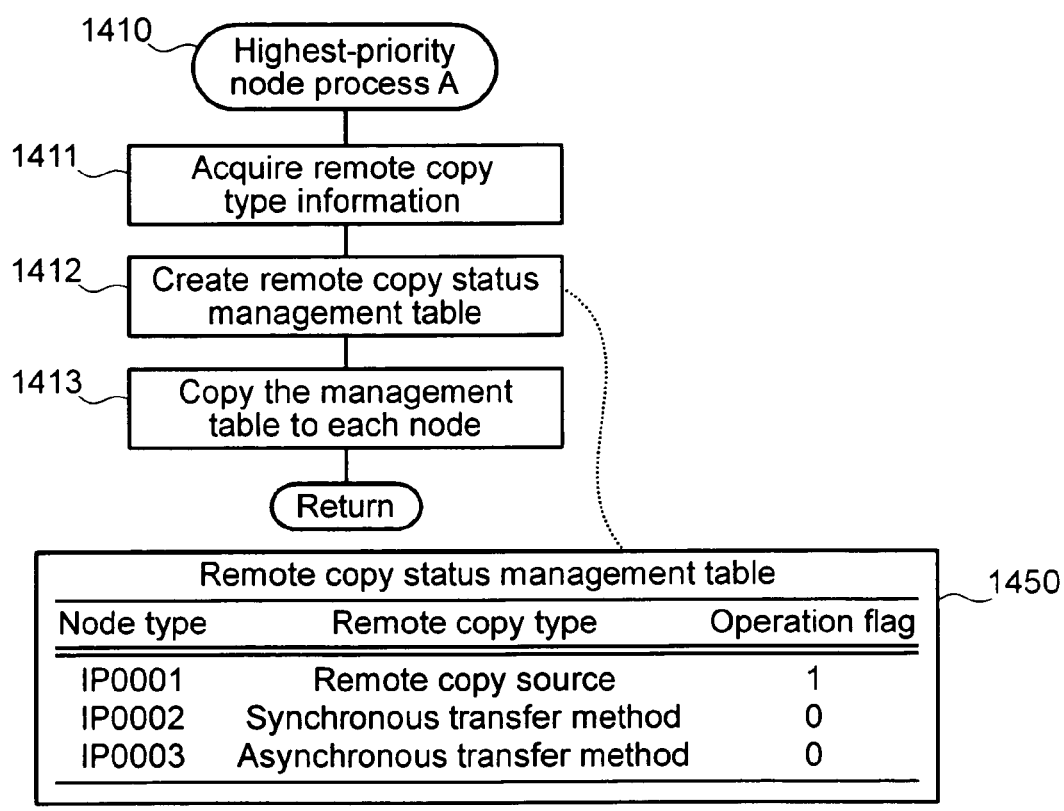
FIG. 5 is a flowchart for creating a remote copy status management table.

The process for creating the management table that is mentioned with reference to FIG. 4 will now be described in detail with reference to FIG. 5. FIG. 5 illustrates the management table creation steps that are performed by the highest-priority node 1310. The highest-priority node 1310 reads the configuration information 1090 from storage system A 1020 to acquire remote copy type information (step 1411). The configuration information 1090 retained by storage system A 1020 within the data center system 1300 includes at least the following three items of information:

1. Information indicating that storage system A 1020 is a remote copy source (a storage system connected to the highest-priority node).

2. Information indicating that data is remote-copied relative to storage system B 1021 by the synchronous transfer method.

3. Information indicating that data is remote-copied relative to storage system C 1022 by the asynchronous transfer method.

Upon receipt of a configuration information request from a node, a storage system passes the above-mentioned configuration information 1090, which includes the information about a data transfer type, to the node that issued the request. The configuration information about a storage system can be acquired by a node when the node transmits SCSI mode selection command VendorUnique or the like to the storage system. After receipt of the configuration information, the highest-priority node 1310 gathers necessary items of information from the configuration information 1090 to create the management table 1450 (step 1412).

An example of the management table is represented by a remote copy status management table 1450 (hereinafter referred to as the management table as appropriate). The management table 1450 presented as an example has three elements: node type for node identification, remote copy type for data transfer method identification, and operation flag for indicating whether the connection to the currently active node is established. The stored node type information indicates an IP address, computer name, or other element identifying a computer serving as a node. The remote copy type information indicates what transfer method (type) is used for a remote copy operation relative to a storage system connected to the highest-priority node. If, for instance, IP0001 represents the highest-priority node, the storage system connected to it is a remote copy source. Therefore, the information in its remote copy type column indicates a remote copy source. A field one position down indicates that the data transfer between IP0002 and IP0001 is based on the synchronous transfer method. A field two positions down indicates that the data transfer between IP0003 and IP0001 is based on the asynchronous transfer method. The operation flag indicates which node is active. In the management table shown in the figure, the number "1" represents the active node. Under normal conditions, the operation flag column for the node connected to a storage system serving as a remote copy source reads "1".

The management table 1450 created in step 1412 is copied to the second-highest-priority node 1311 and standby node 1312, which are on the same network as the highest-priority node 1310 (step 1413). The management table can be anything such as an aggregate of files or pointers, a database, or binary data set. In the description referenced to FIG. 4, the management table for failover node determination is indicated while attention is paid to failover processing load reduction depending on the difference in the employed data transfer method. In FIG. 5, therefore, the information indicating a remote copy type is used as an element of the management table. In a situation where the next high-priority node, that is, the next active node is to be determined in accordance with the storage system performance, however, the management table may be created by extracting the storage system performance information from the configuration information.

Prior to describing in detail the process to be performed in the event of a failure, failures that may occur will now be described briefly. Failures occurring in an active data center can be roughly classified into a failure in a node and a failure in a storage system connected to a node. No matter which type of failure occurs, adequate measures must be taken so that another data center constituting the data center system takes over the job of the failed data center to minimize the interruption of job execution. When a failover switch is performed, it is necessary to perform a failover process for causing another node to take over the process of the failed node and restore the data in the storage system controlled by the failover node to the data that was prevalent immediately before the occurrence of the failure.

If only a node is faulty and the associated storage system is normal, an alternative method may be adopted so that a failover process is performed to let another node take over the process of the failed node and control the original storage system. This alternative method may be employed in a situation, for instance, where a single data center contains a cluster of a plurality of nodes. However, if all the nodes within the same data center become faulty in some way or other, it is necessary to perform a failover switch by using a node in another data center in order to ensure continued job execution. If, in this instance, the storage system-to-node distance is physically large, the response performance may deteriorate. To avoid such a problem, therefore, the resulting failover node uses a storage system within the same data center as the main storage system. Consequently, it is necessary to select a storage system that is the most suitable for the data restoration process (which restores the data that was prevalent before the occurrence of a failure) to be performed after failover.

Figure 6:
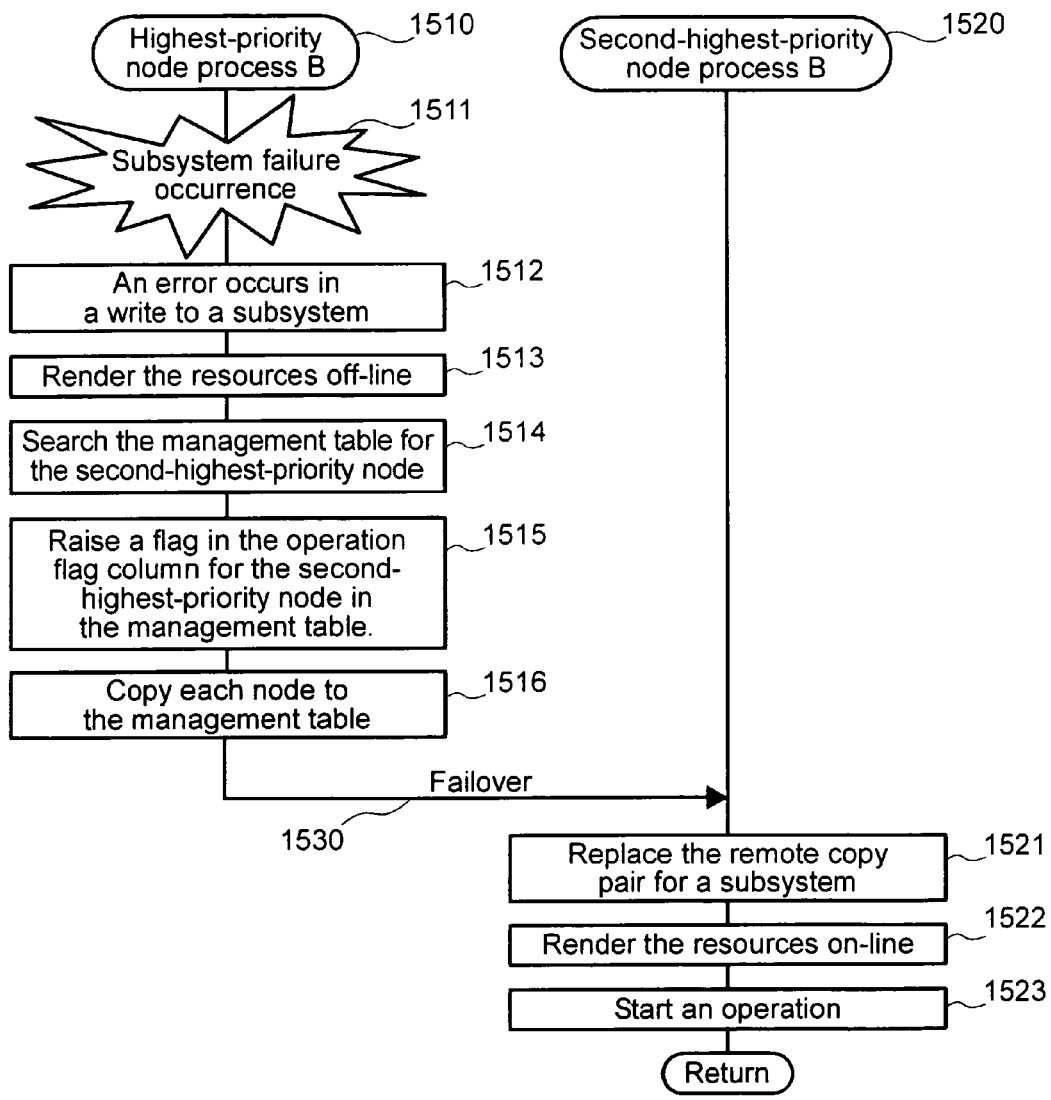
FIG. 6 is a flowchart illustrating a failover process that is performed in the event of a storage system failure with priority given to remote copy operations based on the synchronous transfer method.

FIG. 6 illustrates the process that is performed by the highest-priority node 1310 and the second-highest-priority node 1311 when a failure occurs in storage system A 1020, which is connected to the highest-priority node 1310 shown in FIG. 4.

If a failure occurs in the storage system in step 1511 shown in FIG. 6, the highest-priority node (currently active node) cannot write data into the storage system. More specifically, if a failure occurs in storage system A 1020 (step 1511), which is connected to the highest-priority node 1310, a write process performed relative to storage system A 1020 turns out to be an error (step 1512) so that the highest-priority node's resources go off-line (step 1513). The resources are those which have been used by the highest-priority node 1310, such as a storage system's hard disk drive, a disk owned by a node, an NIC (network interface card) for connecting to a higher-level device and storage system, and other similar hardware and user applications. The active node 1310 in which an error is detected checks via a communication path 1030 shown in FIG. 4 whether the second-highest-priority node 1311, standby node 1312, and other nodes registered in the management table 1080 are normal. When all the other nodes are normal, node 1310 searches the management table 1080 for the remote copy type column to acquire the IP address of the second-highest-priority node connected to a storage system that performs a remote copy operation by the synchronous transfer method (step 1514). If more than one storage system performs a remote copy operation by the synchronous transfer method, some other items of information, such as the performance information about storage systems, may be stored in the management table so that the most suitable storage system can be selected in accordance with such additional information. Another alternative is to select a storage system that is encountered first in a search.

When the IP address of the second-highest-priority node is found, the "highest-priority node"—indicating flag in the operation flag column of the management table 1080 possessed by the highest-priority node 1010 is lowered and a flag is raised in the operation flag column for the IP address of a newly selected node to indicate that it is now active (step 1515). The management table updated in this manner is then transmitted via the communication line 1030 to the other nodes within the data center system in order to update the management tables owned by the other nodes as well (step 1516).

Next, each node starts cluster management software to execute a failover process (step 1530). The failover process includes cluster changeover, data transfer to the newly selected highest-priority node, IP address changeover, and application takeover. The new highest-priority node 1311 generates a remote copy pair by issuing an instruction for making a remote copy pair between storage system B 1021 and storage system C 1022 to storage system B 1021 (this process may also be called "replacement" because it provides remote copy pair regeneration) (step 1521). Storage system B 1021 is now a remote copy source and capable of performing a remote copy operation relative to storage system C 1022. The information about the remote copy pair is stored in storage system B 1021 as the configuration information about storage system B 1021. The new highest-priority node 1311 creates the management table in a sequence described with reference to FIG. 5 and transmits it to the other nodes within the data center system.

Next, node 1311 renders the resources of storage system B 1021 on-line at the second-highest-priority node by performing, for instance, a disk remounting or IP address changeover process (step 1522), thereby allowing storage system B 1021 to connecting to the hard disk drive, and initiates application reexecution or the like. In this manner, node 1311 resumes a normal operation in the same state as prevalent before the occurrence of the failure (step 1523). Failover occurs according to a plan formulated by the operator or upon detection of a failure. Failure detection is achieved because cluster service software, which is installed on the highest-priority node 1310, the second-highest-priority node 1311, and a standby node 1312 shown in FIG. 4, constantly monitors the resources by using a heartbeat for ping response monitoring and like purposes.

Figure 7:
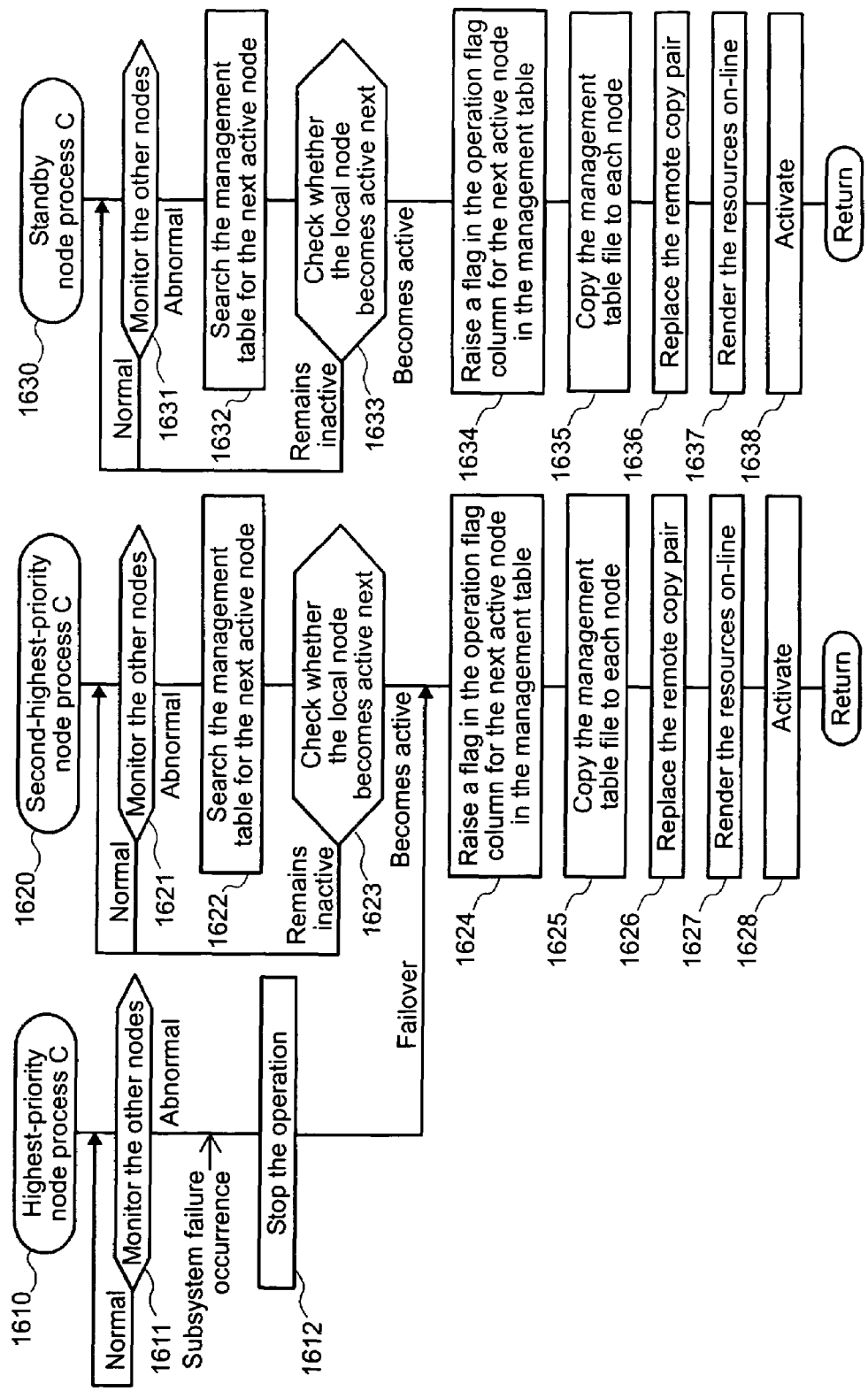
FIG. 7 is a flowchart illustrating a failover process that is performed in the event of a node failure with priority given to remote copy operations based on the synchronous transfer method.

FIG. 7 illustrates the processes that are performed by the highest-priority node 1310, the second-highest-priority node 1311, and a standby node 1312 when a failure occurs in the active, highest-priority node 1310 shown in FIG. 4. As described with reference to FIG. 4, the priorities of these nodes are not fixed. To facilitate understanding the subsequent description of the present embodiment, however, the node 1310 that has been active before its failover switch is called the highest-priority node; the node 1311 targeted for a failover switch initiated by the highest-priority node is called the second-priority node; and the other node 1312 is called a standby node.

The cluster services of the highest-priority node 1310, the second highest-priority node 1311, and a standby node 1312 shown in FIG. 4 constantly monitor the resources by using a heartbeat for ping response monitoring and other purposes (steps 1611, 1621, and 1631). If a failure occurs in the highest-priority node 1310, the second-highest-priority node 1311 and standby node 1312 cannot receive a heartbeat from the highest-priority node 1310. The second-highest-priority node 1311 and standby node 1312 become aware of an abnormality existing in the highest-priority node 1030 because heartbeat reception does not take place normally. When the second-highest-priority node 1311 and standby node 1312 become aware of such an abnormality (steps 1621 and 1631), these nodes respectively reference the management table 1080 that is recorded in the local memory. The details of the management table are shown in FIG. 5. The information about the remote copy type is then searched to retrieve the information about a node for which the "synchronous transfer method" is employed (node 1311 (second-highest-priority node) within the data center system as far as FIG. 4 is concerned) (steps 1622 and 1632).

Next, each node checks whether it is to operate as the new highest-priority node (steps 1623 and 1633). The above check can be completed by judging whether the IP address of the local node agrees with that of the next active node. If the management table 1080 stores the information about a machine name instead of an IP address, the machine names of the nodes must be checked. If the above process concludes that the second-highest-priority node 1311 is the next active node, the flag in the highest-priority node operation flag column in the management table within the second-highest-priority node is changed from "1" to "0" with the flag in the next-highest-priority node operation flag column changed from "0" to "1" (step 1624). The second-highest-priority node now becomes the highest-priority node. The previous standby node 1312 now becomes the second-highest-priority node. Node 1311, which is now the highest-priority node, copies a new management table 1080 to the standby node 1312 via the communication line 1030 (step 1625).

The new highest-priority node 1311 issues an instruction to storage system B 1021 for forming a remote copy pair based on the synchronous transfer method, for which storage system B 1021 serves as a copy source, between storage system B 1021 and storage system A 1020. Further, the new highest-priority node 1311 issues an instruction for forming a remote copy pair based on the asynchronous transfer method, for which storage system B 1021 serves as a copy source, between storage system B 1021 and storage system A 1020 (step 1626). Next, node 1311 renders the resources of storage system 1321 on-line in accordance with the new management table information and configuration information (step 1627). Node 1311 is now in the same state as node 1310 when the latter node served as the highest-priority node before failover (step 1628). As regards the operation to be performed between nodes 1310 and 1311, which originally performed synchronous copy operations, data consistency is achieved between their subordinate storage systems. Therefore, the operation to be performed between these nodes can be started immediately after failover simply by changing the synchronous copy direction. As regards the operation to be performed between the former high-priority node and standby node, which originally performed asynchronous copy operations, it is necessary to assure data consistency after failover. The necessity for data consistency assurance will now be described.

As described earlier, the new highest-priority node 1311 issues an instruction to storage system B 1021 for performing a remote copy based on the synchronous transfer method, for which storage system B 1021 serves as a copy source, from storage system B 1021 to storage system A 1020. Further, the new highest-priority node 1311 issues an instruction to storage system B 1021 for performing a remote copy based on the asynchronous transfer method, for which storage system B 1021 serves as a copy source, from storage system B 1021 to storage system C 1022. However, the data retained by storage system C 1022, which so far performed an asynchronous copy to storage system A 1020, is not always up to date. In other words, it is possible that some data in storage system A 1020 may not be copied to storage system C 1022 (the data left uncopied in this manner is hereinafter referred to as untransferred data). More specifically, storage system C 1022 is not up to date, and storage system A 1020 might have untransferred data of storage system C 1022.

The new highest-priority node 1311 then instructs its subordinate storage system B 1021 to "issue an instruction for requesting the information about untransferred data retained by storage system A 1020". Upon receipt of the above instruction, storage system B 1021 issues, for instance, an untransferred data information request command, which is based on a vendor unique SCSI command, to storage system A 1020 to request the information about untransferred data. Upon receipt of the above request from storage system B 1021, storage system A 1020 transmits the information about untransferred data to storage system B 1021.

Figure 11:
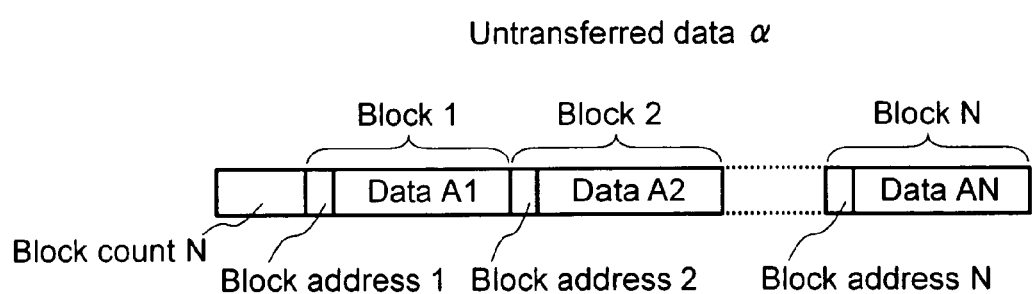
FIG. 11 shows a data format for untransferred data.

The information about untransferred data will now be described with reference to FIG. 11. As shown in FIG. 11, untransferred data α has a data structure, which comprises a total block count N and N data blocks (block 1, block 2, and so on to block N in the figure). Each data block consists of a block address and its data (data A1, data A2, and so on to data AN). For simplicity of explanation, data A1 to data AN are assumed to have a fixed length; however, variable-length data may alternatively be retained with data size information retained in a block.

After being requested to present the information about untransferred data, storage system A 1020 returns the total block count N, which represents the total number of untransferred local data blocks, to storage system B 1021 as a response. Upon receipt of untransferred data α, storage system B 1021 checks whether the block count N within untransferred data α remains to be a positive value. If the block count N is positive, storage system B 1021 concludes that storage system A 1020 retains one or more untransferred data blocks. Untransferred data α, which is equivalent in size to N blocks, is then transferred to storage system B 1021. For storage system C 1022, storage system B 1021 sets an asynchronous data transfer method in which storage system B serves as a copy source, and then sequentially copies untransferred data α, which is received from storage system A 1020, to storage system C 1022. If a write instruction for storage system B 1021 arrives from the new highest-priority node 1311 before untransferred data α is completely copied from storage system B 2021 to storage system C 1022, storage system B 1021 forms a task schedule so that the data designated by the write instruction will be copied to storage system C 1022 after untransferred data α.

When the above method is used, node 1311 is prevented from writing the data written in storage system B 1021 into storage system C 1022 before untransferred data α is completely written into storage system C 1022. If data written in compliance with a write instruction from node 1311 is to be overwritten by untransferred data α, which is delivered to storage system B 1021 from storage system A 1020, only the latest data will be transmitted to storage system C 1022. Therefore, the amount of data transfer from storage system B 1021 to storage system C 1022 may be reduced by refraining from writing into storage system C 1022 the data that is received from storage system A 1020 but overwritten and rendered unnecessary.

The method for copying untransferred data α, which is still not transferred from storage system A 1020 to storage system C 1022, to storage system C 1022 via storage system B 1021 has been described. However, an alternative method may be used so as to transfer untransferred data α directly from storage system A 1020 to storage system C 1022.

An example of the above data transfer method will now be described. If a failover switch to node 1311 occurs due, for instance, to a failure occurrence in node 1310, storage system B 1021 uses an untransferred data request command based on a vendor unique SCSI command to determine the block count N of untransferred data α that is retained by storage system A 1020. If the block count N remains to be a positive value, the block count N value is periodically confirmed and a write into storage system C 1022 is blocked until the block count N reaches 0 (zero) even if node 1311 issues a write instruction relative to storage system B 1021. (The asynchronous remote copy operation is interrupted so that the copy operation for data consistency takes precedence.) When storage system B 1021 verifies that the block count N is 0 (zero), it permits storage system C 1022 to be written into, and starts a remote copy operation.

Data deficiency of a storage system where data has been stored by asynchronous copy operations is corrected in a manner described above. In other words, if the currently operating node needs to perform a failover switch to another node for some reason, the present embodiment first selects a node having a subordinate storage system that performs synchronous copy operations, and causes the selected node to take over the operation conducted so far. This feature ensures that the data center can be operated immediately after failover. Further, the data in a storage system under the newly selected, active, highest-priority node is controlled so as to be redundant relative to a storage system that has existed as a standby system at a remote place.

As described earlier, the storage system existing as a standby system often performs asynchronous copy operations relative to the previous highest-priority node because it is located at a remote place. Therefore, the present embodiment exercises task schedule management over the data whose remote copy operation is not completed relative to the storage system under the previous highest-priority node, and performs a copy process prior to the new asynchronous remote copy operation to be started for the purpose of ensuring that the data in the storage system that newly becomes an asynchronous remote copy destination can be used as redundant data. If the above task control is exercised by the storage system under a node that becomes the highest-priority node after failover, transfer priority control can be exercised with increased ease over I/O requests from the newly selected highest-priority node and untransferred data. Further, processing step 1633 shown in FIG. 7 verifies that a failover switch to the standby node 1312 shown in FIG. 4 does not occur. Therefore, the standby node 1312 reverts to a state in which it monitors the other nodes without performing processing steps 1634 to 1638.

For storage system C 1022, too, it is understood that the remote copy destination and source for new remote copy operations will be defined in accordance with an instruction from the newly selected priority node. Further, as described earlier, storage system C 1022 is subjected upon the start of operation to task management over data that has not been asynchronously remote-copied before failover so that the data to be stored is received in advance.

In a manner described above, failover occurs for maintenance management purposes so that the functionality of the main data center 1001 shown in FIG. 4 is taken over by the near sub data center 1002. This ensures that job execution continues without a break (or resumes after a brief period of interruption). If the main data center 1001 becomes ready to resume its operation while it is being conducted by the sub data center 1002 as described above, a recovery process is performed as described below.

Figures 8, 9:
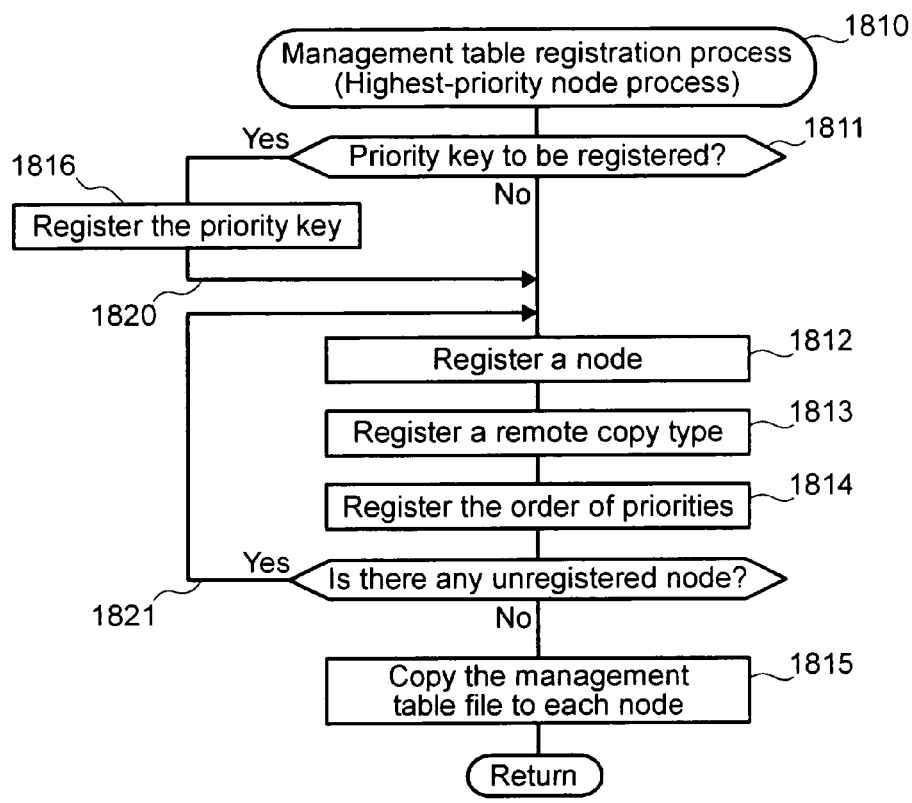
FIG. 8 is a flowchart illustrating the processing steps for management table manual registration.
FIG. 9 is a table illustrating a management table that is used when a plurality of priority keys are provided.

FIG. 9 illustrates another embodiment of the remote copy status management table. In the remote copy status management table shown in FIG. 9, priority keys are defined for each node. If no failure exists in the data center system or no shutdown is planned for data center maintenance, a node having the highest priority, which is defined by the priority keys, becomes active to serve as the highest-priority node (remote copy source), and the other nodes go on standby (become remote copy destinations).

Figure 10:
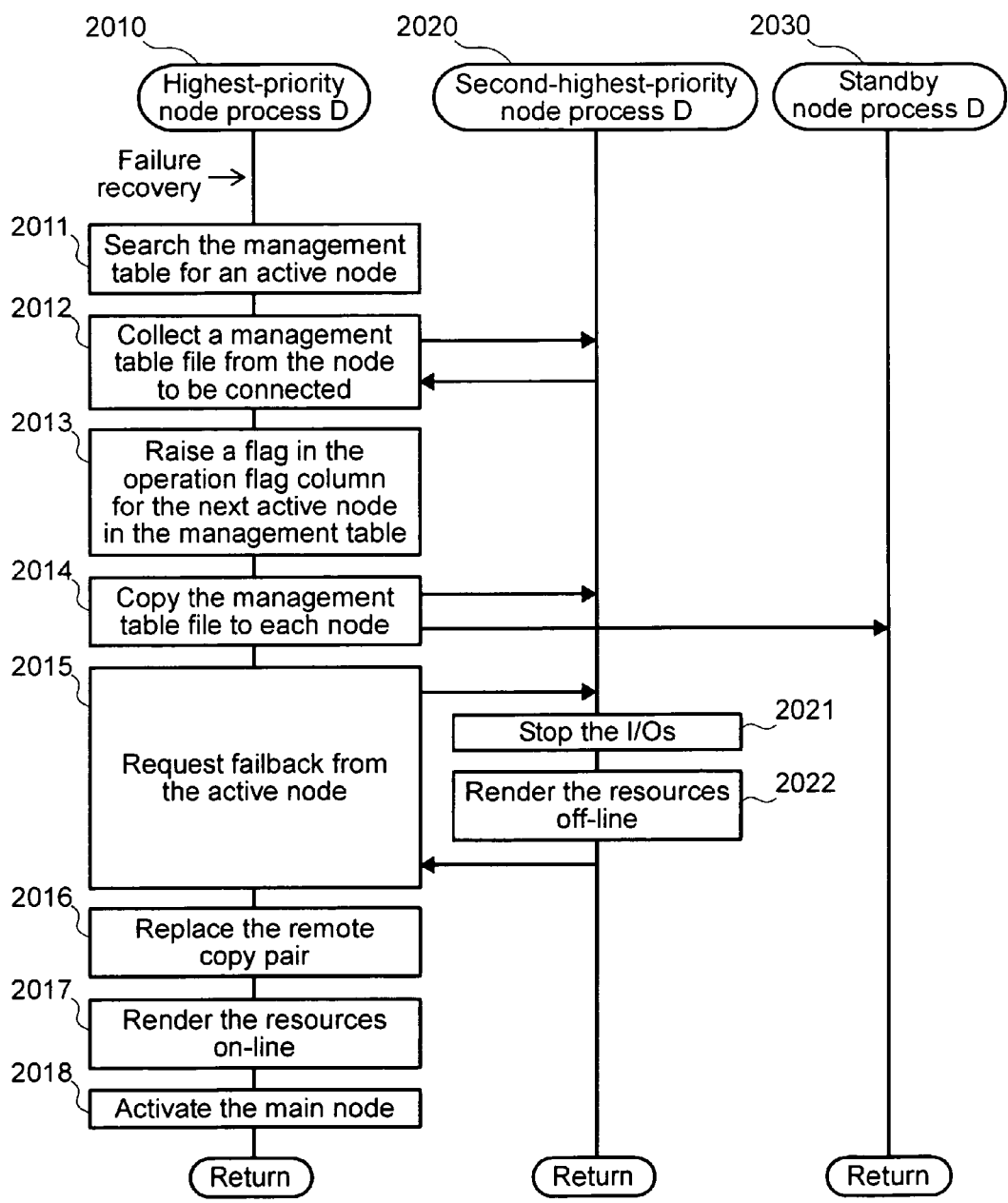
FIG. 10 is a flowchart illustrating a recovery monitoring process and a recovery process.

Priority key 1 in FIG. 9 represents the priority, which increases with an increase in the priority key numerical value. FIG. 10 shows a sequence that is followed when node B performs a failback process for high-priority node A after node A recovers from its failure in a situation where second-highest-priority node B is active due to a failure in node A. The subsequent description assumes that a storage system connected as a subordinate to node A is referred to as storage system A, and that a storage system connected as a subordinate to node B is referred to as storage system B, and further that a storage system connected as a subordinate to node C is referred to as storage system C.

When node A, which has a higher priority than node B, recovers from its failure, node A references the remote copy status management table (hereinafter referred to as the management table) shown in FIG. 9, which is retained inside node A, to search for the currently active node (step 2011). In this instance, it is possible that the management table retained by node A may not be updated. Therefore, node A first searches for the active node. In FIG. 10, node B is active. Therefore, the management table retained by node B is obtained from node B and then retained as the new management table within node A (step 2012). The example shown in FIG. 10 indicates that node B is currently active. If node B is not active, a search should be conducted to sequentially check whether nodes having lower priorities are active.

Node A notes the information within the management table received from node B and makes flag adjustments to render node A active. More specifically, node A lowers the operation flag of node B, which is currently active, and raises the operation flag of node A (step 2013), and then copies the updated management table to node B and node C (step 2014). Upon receipt of a failback request (step 2015), node B, which is currently active, stops the I/Os relative to its storage system (step 2021) and renders the resources off-line (step 2122). Upon failback, node A, which now has the highest priority, instructs its subordinate storage system to obtain the latest data from storage system B. Node A effects remote copy pair replacement (step 2016) by issuing an instruction to storage system A for performing a remote copy operation based on the synchronous transfer method from storage system A to storage system B and a remote copy operation based on the asynchronous transfer method from storage system A to storage system C. Node A renders the hard disk and resources of storage system A on-line (step 2017), and takes over the process of node B to resume the normal operation (step 2018). It is needless to say in this instance that task schedule management is exercised as described earlier for untransferred data in order to assure consistency of data that was asynchronously remote-copied before failback.

The above describes a first embodiment. A second embodiment performs a failover switch only to a node connected to a storage system that performs remote copy operations based on the synchronous transfer method. For a storage system that performs remote copy operations based on the asynchronous transfer method, the second embodiment merely makes a backup.

The second embodiment performs the same processes as the first embodiment except that nodes that are registered in the management table 1450 shown in FIG. 5 and set for remote copy operations based on the asynchronous transfer method are searched for in the processing steps 1514, 1622, 1632 for the purpose of locating the next active node, excluding nodes whose remote copy type is "synchronous transfer method".

In a third embodiment, a node or storage system automatically sets the order of highest-priority node failover priorities. As indicated by the table in FIG. 9, the third embodiment adds a plurality of priority keys as management table elements and uses them as failover destination selection conditions. Further, these priority keys can be used as the information for defining the individual node priorities. After a failover switch is performed from the highest-priority node to the second-highest-priority node for some reason, the third embodiment performs a failback process for the original high-priority node in accordance with the order of priorities indicated by the priority keys as described earlier. A plurality of priority keys may be furnished as shown in FIG. 9 so as to vary the priorities themselves in accordance with various conditions.

When the highest-priority node 1310 performs a failover switch to another node, the first embodiment searches for the next active node using a remote copy type as a key. The third embodiment, however, registers the key data about an item to be preferred as a "priority key" at the time of failover. For example, a ping command can be executed respectively from the highest-priority node 1310 to the second-highest-priority node 1311 and from the highest-priority node 1310 to a standby node 1312 in order to register the resulting response time as "priority key" data. More specifically, a "priority key" will be searched for instead of a remote copy type in the processing steps 1622, 1632 for searching for the next active node when a failover switch is performed from the highest-priority node 1310 shown in FIG. 7. For example, it is possible to search for a node whose response time is short as the next active node, locate a near storage system automatically, and set it as a failover destination.

In a fourth embodiment, the user predefines the order of failover priorities for the currently active, highest-priority node 1310. FIG. 8 illustrates a management table registration process 1810 that is manually performed by the user. The management table registration process 1810 is executed at the highest-priority node 1310. If there is a "priority key" that serves as a key for determining the order of failover (step 1811), the user enters the "priority key" (step 1816). The user next performs a node registration procedure 1812, a remote copy type registration procedure 1813, and a priority key value or priority order registration procedure 1814 for all nodes that are connected to the same network (step 1821), and copies the management table file to each node (step 1815). The node registration procedure and remote copy type registration procedures do not always have to be performed manually. These procedures may alternatively be completed by highest-priority node process A 1410 as indicated in FIG. 5.

The first to fourth embodiments of a data center system comprising three data centers have been described. However, the present invention is also applicable to a situation where the asynchronous transfer method is employed between storage system A 1020 and storage system B 1021 as shown in FIG. 1. Further, the present invention can also be applied to a data center system comprising more than three data centers.

Furthermore, it is understood that the present invention can also be applied to a system that comprises more than three sets of a host computer having a cluster service and a storage system connected to it, connects the host computers to the same computer network, and connects the storage systems to the computer network to perform remote copy operations between the storage systems.

The configuration according to the present embodiment makes it possible to perform an efficient failover process in the event of a failure.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A data center system, comprising:
a first data center including a first computer and a first storage system; a second data center including a second computer and a second storage system; and a third data center including a third computer and a third storage system, wherein the first storage system, the second storage system, and the third storage system are operatively connected with each other,
wherein said first computer, said second computer, and said third computer each include a management table having a plurality of priority keys defining computer priority order for failover,
wherein said first computer selects one of the plurality of priority keys and selects one of said second computer and said third computer as a failover computer according to the computer priority order defined by the one of the plurality of priority keys; and
wherein a failover switch is performed from said first computer to said failover computer;

wherein said first computer is an active computer;
wherein said second storage system and said third storage system are each configured to store a copy of data from said first storage system by remote copy operation; and wherein said information is defined according to types of the remote copy operation used for said second storage system and said third storage system;
wherein said second storage system is configured to store a copy of the data from said first storage system by synchronous remote copy operation; wherein said third storage system is configured to store a copy of the data from said first storage system by asynchronous remote copy operation; and wherein said second storage system has higher priority than said third storage system.

2. The data center system according to claim 1, wherein said third storage system is positioned at greater distances from said first storage system and said second storage system than a distance between said first storage system and said second storage system.

3. The data center system according to claim 1, wherein said management table has, for each computer, an item indicating a type of remote copy operation and an item indicating priority for failover.

4. The data center system according to claim 3, wherein the computers are configured to permit manual registration of said management table.

5. The data center system according to claim 1, wherein said management table is generated based on storage system configuration information stored in at least one of said first storage system, said second storage system, and said third storage system.

6. The data center system according to claim 1, wherein the priority order for failover is customized according to predetermined conditions.

7. The data center system according to claim 6, wherein the priority order for failover is determined based on a first response time between said first computer and said second computer and a second response time between said first computer and said third computer.

8. The data center system according to claim 1, wherein said management table is generated by one of said first computer, said second computer, or said third computer having a priority order that is greater than the others.

9. A method for controlling a data center system, which comprises a first data center including a first computer and a first storage system, a second data center including a second computer and a second storage system, a third data center including a third computer and a third storage system, wherein the first storage system, the second storage system, and the third storage system are operatively connected with each other via a network, said method comprising:
providing a management table having a plurality of priority keys defining computer priority order for failover;
causing at least one of said second computer and said third computer to monitor an operating status of said first computer;
copying data stored in said first storage system to said second computer and said third computer via the network;
if at least one of said second computer and said third computer detects a failure of operation in said first computer, causing said at least one of second computer and said third computer to refer to said management table to select one of the plurality of priority keys and to select one of said second computer and said third computer as a failover computer according to the computer priority order for failover defined by the one of the plurality of priority keys; and
performing a failover switch from said first computer to said failover computer,
wherein said first computer is an active computer; wherein said second storage system and said third storage system are each configured to store a copy of data from said first storage system by remote copy operation: and wherein said priority keys are defined according to types of the remote copy operation used for said second storage system and said third storage system;
wherein, if a synchronous remote copy operation is performed between said first storage system and said second storage system and asynchronous remote copy operation is performed between said first storage system and said third storage system, said second computer is selected as the failover computer connected with said second storage system which has higher priority than said third storage system.

10. The method for controlling a data center system according to claim 9, wherein said first computer is an active computer; wherein said second storage system and said third storage system are each configured to store a copy of data from said first storage system by remote copy operation; wherein said third storage system is positioned at greater distances from said first storage system and said second storage system than a distance between said first storage system and said second storage system; and wherein said second computer is selected as the failover computer.

11. The method for controlling a data center system according to claim 9, further comprising generating said information based on storage system configuration information stored in at least one of said first storage system, said second storage system, and said third storage system.

12. The method for controlling a data center system according to claim 9, wherein each of said computers has an operation flag for indicating which computer is connected to one of said storage systems which serves as a remote copy source, the method further comprising:
when a failure of operation occurs in said first computer, causing said failover computer to turn ON a status of said operation flag for the remote copy source, and to update statuses of operation flags within the other computers; and
causing said failover computer to set up remote copy operation in relation to a remote storage system as a remote copy destination so as to define the storage system connected to the failover computer as the remote copy source.

13. The method for controlling a data center system according to claim 12, further comprising, if said remote storage system serving newly as the remote copy destination was an asynchronous remote copy destination before failover, transferring data that is untransferred during a period of said asynchronous remote copy to said storage system prior to a newly set remote copy data transfer.

14. The method according to claim 9, wherein the priority order for failover is customized according to predetermined conditions.

15. The method according to claim 14, wherein the priority order for failover is determined based on a first response time between said first computer and said second computer and a second response time between said first computer and said third computer.

16. The method for controlling a data center system according to claim 9, wherein providing said management table is performed by one of said first computer, said second computer, or said third computer having a priority order that is greater than the others.

17. A computer program product used in a data center system, which comprises a first data center including a first computer and a first storage system, a second data center including a second computer and a second storage system, and a third data center including a third computer and a third storage system, wherein the first storage system, the second storage system, and the third storage system are operatively connected with each other, said computer program product comprising:
   a computer usable medium having computer readable program embodied in the computer usable medium for execution by the computers of the data center system, wherein said computer program comprises:
   code for causing at least one of said second computer and said third computer to monitor an operating status of said first computer;
   code for copying data stored in said first storage system to said second computer and said third computer via the network;
   code for, if at least one of said second computer and said third computer detects a failure of operation in said first computer, causing said at least one of second computer and said third computer to select one of a plurality of priority keys from a management table and to select one of said second computer and said third computer as a failover computer according to computer priority order for failover defined by the one of the plurality of priority keys; and
   code for performing a failover switch from said first computer to said failover computer;
   wherein said first computer is an active computer;
   wherein said second storage system and said third storage system are each configured to store a copy of data from said first storage system by remote copy operation: and
   wherein said priority keys are defined according to types of the remote copy operation used for said second storage system and said third storage system;
   wherein, if synchronous remote copy operation is performed between said first storage system and said second storage system and asynchronous remote copy operation is performed between said first storage system and said third storage system, said second computer is selected as the failover computer connected with said second storage system which has a higher priority than said third storage system.

18. The program product according to claim 17, wherein said first computer is an active computer; wherein said second storage system and said third storage system are each configured to store a copy of data from said first storage system by remote copy operation; wherein said third storage system is positioned at greater distances from said first storage system and said second storage system than a distance between said first storage system and said second storage system; and wherein said second computer is selected as the failover computer connected with said second storage system.

19. The program product according to claim 17, wherein said computer program further comprises code for generating said priority keys regarding priority for failover based on storage system configuration information stored in at least one of said first storage system, said second storage system, and said third storage system.

20. The program product according to claim 17, wherein each of said computers has an operation flag for indicating which computer is connected to one of said storage systems which serves as a remote copy source, and wherein said computer program further comprises:
   code for, when a failure of operation occurs in a first computer, causing said failover computer to turn ON a status of said operation flag for the remote copy source, and to update statuses of operation flags within the other computers; and
   code for causing said failover computer to set up remote copy operation in relation to a remote storage system as a remote copy destination to define the storage system connected to the failover computer as the remote copy source.

21. The program product according to claim 20, wherein said computer program further comprises code for, if said remote storage system serving newly as the remote copy destination was an asynchronous remote copy destination before failover, transferring data that is untransferred during a period of said asynchronous remote copy to said storage system prior to a newly set remote copy data transfer.

22. The computer program product according to claim 17, wherein the priority order for failover is customized according to predetermined conditions.

23. The computer program product according to claim 17, wherein the priority order for failover is determined based on a first response time between said first computer and said second computer and a second response time between said first computer and said third computer.

24. The computer program product according to claim 19, wherein one of said first computer, said second computer, or said third computer has a priority order that is greater than the others, and said code for generating said priority keys causes said greatest priority order computer to provide said management table.

* * * * *